US010618478B2

(12) United States Patent
Nakai et al.

(10) Patent No.: US 10,618,478 B2
(45) Date of Patent: Apr. 14, 2020

(54) WIRE HARNESS AND CONNECTION STRUCTURE FOR WIRE HARNESS

(71) Applicant: SUMITOMO WIRING SYSTEMS, LTD., Yokkaichi-shi, Mie (JP)

(72) Inventors: Hirokazu Nakai, Yokkaichi (JP); Tomohiro Yabashi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/480,131

(22) PCT Filed: Jan. 19, 2018

(86) PCT No.: PCT/JP2018/001674
§ 371 (c)(1),
(2) Date: Jul. 23, 2019

(87) PCT Pub. No.: WO2018/139377
PCT Pub. Date: Aug. 2, 2018

(65) Prior Publication Data
US 2019/0337473 A1    Nov. 7, 2019

(30) Foreign Application Priority Data
Jan. 26, 2017   (JP) ................................. 2017-012155

(51) Int. Cl.
*H01B 7/20* (2006.01)
*B60R 16/02* (2006.01)
(Continued)

(52) U.S. Cl.
CPC ....... *B60R 16/0215* (2013.01); *H01B 7/0045* (2013.01); *H01B 7/20* (2013.01); *H02G 3/0406* (2013.01); *H02G 3/0462* (2013.01)

(58) Field of Classification Search
CPC .... B60R 16/0215; H01B 7/0045; H01B 7/20; H02G 3/0406; H02G 3/0462
(Continued)

(56) References Cited

U.S. PATENT DOCUMENTS 9,691,527 B2 *   6/2017   Adachi ............... H01R 13/504
2008/0113559 A1 *  5/2008  Hamai ................ H01R 9/0527
439/607.41
(Continued)

FOREIGN PATENT DOCUMENTS

| JP | 2002-335618 A | 11/2002 |
| JP | 2012-056368 A | 3/2012 |
| JP | 2014180072 | * 9/2014 |

OTHER PUBLICATIONS

Mar. 27, 2018 Search Report issued in International Patent Application No. PCT/JP2018/001674.

*Primary Examiner* — Timothy J Thompson
*Assistant Examiner* — Michael F McAllister
(74) *Attorney, Agent, or Firm* — Oliff PLC

(57) ABSTRACT

A wire harness that includes a braid composed of conductive strands; a cylindrical conductor that is electrically connected to the braid and can be attached to an attachment target; and an electrical wire inserted into the braid and the cylindrical conductor, wherein the cylindrical conductor includes a rotation restriction that restricts rotation of the cylindrical conductor with respect to the attachment target by engaging with the attachment target in a circumferential direction of the cylindrical conductor, and the rotation restriction also restricts the cylindrical conductor from moving in an axial direction of the cylindrical conductor by engaging with the attachment target in the axial direction.

6 Claims, 3 Drawing Sheets

(51) Int. Cl.
*H01B 7/00* (2006.01)
*H02G 3/04* (2006.01)

(58) Field of Classification Search
USPC ........................................... 174/72 A
See application file for complete search history.

(56) References Cited

U.S. PATENT DOCUMENTS

| | | | |
|---|---|---|---|
| 2014/0216812 A1* | 8/2014 | Adachi | B60R 16/0215 174/72 A |
| 2015/0041175 A1* | 2/2015 | Nakai | B60R 16/0215 174/83 |
| 2017/0181337 A1* | 6/2017 | Itani | H05K 9/0018 |
| 2019/0223333 A1* | 7/2019 | Yokoyama | H01B 7/0045 |

* cited by examiner

WIRE HARNESS AND CONNECTION STRUCTURE FOR WIRE HARNESS

This application is the U.S. National Phase of PCT/JP2018/001674 filed Jan. 19, 2018, which claims priority to JP 2017-012155 filed Jan. 26, 2017, the entire disclosure of which is incorporated herein by reference.

BACKGROUND

The present disclosure relates to a wire harness and a connection structure for a wire harness.

Conventionally, as shown in JP 2012-56368A for example, a vehicle such as a hybrid car or an electric automobile has included: a motor serving as a motive power source for vehicle travel; an inverter connected to the motor; and a high-voltage battery that supplies power to the inverter, and the inverter and the high-voltage battery have been connected by multiple electrical wires.

In the wire harness shown in JP 2012-56368A, as a countermeasure against electromagnetic noise, the periphery of the electrical wire is covered with an electromagnetic shield component. A braided member, which is an example of an electromagnetic shield component, is connected using, for example, a cylindrical conductive member (in JP 2012-56368A, a grounding pipe) and a band.

SUMMARY

Incidentally, in a wire harness such as that described above, as shown in FIG. 6, an end portion of the cylindrical conductive member 101 is fixed by being held by a conductive box member 102 provided in the vehicle. The box member 102 is formed by fitting together two cover members 102a and 102b, for example, and is provided with an opening portion 103 and a housing space, inside of which an electrical wire or the like can be inserted when the cover members 102a and 102b are fit together. A groove portion 103a is provided in the opening portion 103 of the box member 102, and when the cylindrical conductive member 101 is attached to the box member 102, a flange portion 101a of the cylindrical conductive member 101 is fit into the groove portion 103a. Accordingly, the flange portion 101a of the cylindrical conductive member 101 engages with (comes into contact with) the groove portion 103a of the box member 102 in the direction opposite to the insertion direction of the cylindrical conductive member 101, and therefore a case is suppressed in which the cylindrical conductive member 101 comes out of the opening portion 103 of the box member 102.

However, since the cylindrical conductive member has a circular cylindrical shape, if the cylindrical conductive member is attached to an attachment target such as the above-mentioned box member, there is a risk of rotation about the central axis of the cylindrical conductive member.

An exemplary aspect of the disclosure provides a wire harness and a connection structure for a wire harness according to which it is possible to restrict rotation of a cylindrical conductive member with respect to an attachment target.

A wire harness according to an exemplary aspect includes a braid composed of conductive strands; a cylindrical conductor that is electrically connected to the braid and can be attached to an attachment target; and an electrical wire inserted into the braid and the cylindrical conductor, wherein the cylindrical conductor includes a rotation restriction that restricts rotation of the cylindrical conductor with respect to the attachment target by engaging with the attachment target in a circumferential direction of the cylindrical conductor, and the rotation restriction also restricts the cylindrical conductor from moving in an axial direction of the cylindrical conductor by engaging with the attachment target in the axial direction.

According to this configuration, due to the cylindrical conductor including the rotation restriction that engages with the attachment target in the circumferential direction of the cylindrical conductor, it is possible to restrict rotation of the cylindrical conductor with respect to the attachment target.

In the above-described wire harness, it is preferable that the rotation restriction is a radial direction extension that extends outward in a radial direction of the cylindrical conductor from an outer circumference of the cylindrical conductor.

According to this configuration, due to the cylindrical conductor having the radial direction extension, the engagement with the attachment target in the circumferential direction of the cylindrical conductor can be made reliable.

In the above-described wire harness, it is preferable that the radial direction extension portion is one of a plurality of radial extensions provided in the circumferential direction of the cylindrical conductor.

According to this configuration, due to having multiple radial direction extensions, it is possible to make the engagement with the attachment target in the circumferential direction of the cylindrical conductor more reliable.

In the above-described wire harness, it is preferable that the rotation restriction has an insertion hole into which a fastener for fastening the cylindrical conductor to the attachment target can be inserted.

According to this configuration, the rotation restriction has an insertion hole through which a fastener that fastens the cylindrical conductor to the attachment target can be inserted, and therefore rotation can be restricted by fastening the cylindrical conductor to the attachment target.

In a connection structure for a wire harness for solving the above-described problem, the above-described cylindrical conductor of the wire harness is connected to the attachment target, which includes: an opening into which the cylindrical conductor can be inserted; a first engagement that engages with the cylindrical conductor in the insertion direction when the cylindrical conductor is inserted into the opening; and a second engagement that engages with the rotation restriction in the circumferential direction of the cylindrical conductor.

According to this configuration, by attaching the cylindrical conductor to the attachment target, it is possible to retain the cylindrical conductor using the first engagement and to prevent rotation of the cylindrical conductor due to engagement between the second engagement and the rotation restriction.

In a connection structure for a wire harness for solving the above-described problem, the above-described cylindrical conductor of the wire harness is connected to the attachment target using a fastener that is inserted into the insertion hole of the cylindrical conductor.

According to this configuration, by connecting the cylindrical conductor to the attachment target using the fastener, it is possible to electrically connect the cylindrical conductor to the attachment target and prevent rotation of the cylindrical conductor.

According to the wire harness and the connection structure for a wire harness of the present disclosure, it is possible to restrict rotation of a cylindrical conductor with respect to an attachment target.

DETAILED DESCRIPTION OF EMBODIMENTS

Figure 1:
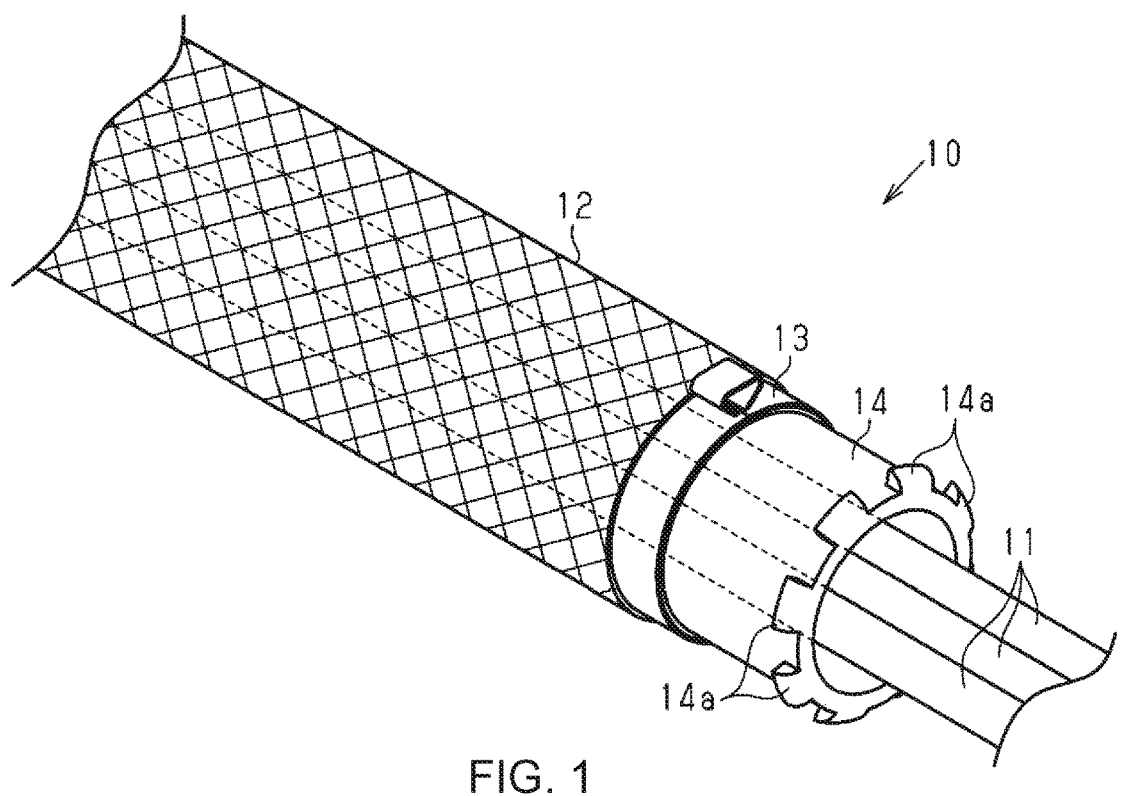
FIG. 1 is a perspective view of a wire harness of an embodiment.

Hereinafter, an embodiment of a wire harness will be described in accordance with the drawings. Note that in the drawings, for the sake of convenience of description, parts of the configuration will be shown in an exaggerated or simplified manner in some cases. Also, the dimensional proportions of the portions differ from reality in some cases.

As shown in FIG. 1, a wire harness 10 includes: multiple high-voltage electrical wires 11; a braided member 12 (braid) inside of which the high-voltage electrical wires 11 are to be inserted; and an approximately circular cylinder-shaped cylindrical conductive member 14 (cylindrical conductor) that is connected to the braided member 12 using a band 13 made of metal. The wire harness 10 of the present embodiment is for connecting an inverter installed in a vehicle and a wheel driving motor serving as a motive power source for vehicle travel, for example, in a vehicle such as a hybrid car or an electric automobile, for example. The inverter is connected to a high-voltage battery that can supply a voltage of several hundred volts, and is for converting direct-current power supplied from the high-voltage battery into alternating-current power and supplying the alternating-current power to the wheel driving motor via the wire harness 10. Note that three high-voltage electrical wires 11 are provided so as to correspond to the three-phase alternating-current power supplied to the wheel driving motor.

The high-voltage electrical wires 11 each have a core wire, and an insulating covering that covers the core wire. Also, each electrical wire 11 is a non-shield electrical wire that does not have a shield structure, and is a wire that can handle high voltages and large currents.

The braided member 12 is a cylindrical member constituted by braiding multiple metal strands, and the high-voltage electrical wire 11 is inserted therein.

The cylindrical conductive member 14 has a cylindrical shape with openings formed at both ends, and the braided member 12 is connected to one end portion from the outside using a band 13 in a state in which the braided member 12 covers (fits over) the one end portion. The high-voltage electrical wire 11 is inserted into the cylindrical conductive member 14.

Figure 2:
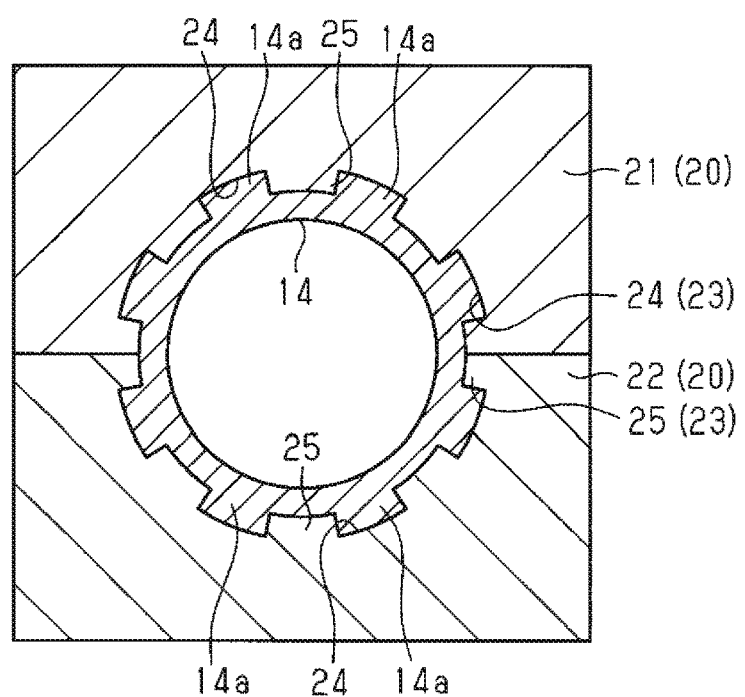
FIG. 2 is a cross-sectional view of a cylindrical conductive member and a box member of the wire harness of the embodiment.
Figure 3:
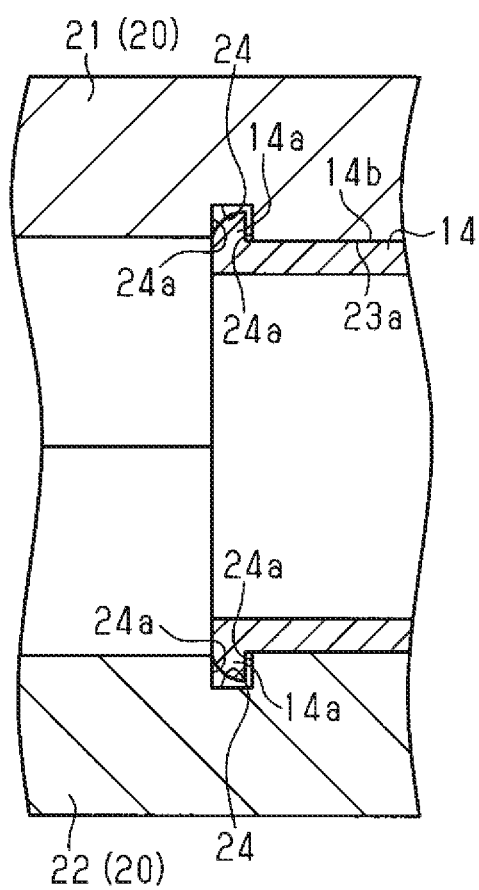
FIG. 3 is a cross-sectional view of a cylindrical conductive member and a box member of the wire harness of the embodiment.

As shown in FIGS. 2 and 3, the cylindrical conductive member 14 is constituted by a conductive material. Multiple radial direction extension portions 14a that extend outward in a radial direction are provided at approximately equal angular intervals in the circumferential direction on the other end portion of the cylindrical conductive member 14, and are attached to a box member 20 made of metal, for example.

As shown in FIGS. 2 and 3, due to assembling the box member 20 in a state in which the opening portion of the first cover 21, which has a bottomed cylindrical shape, and the opening portion of the second cover 22, which has a bottomed cylindrical shape, oppose each other, the box member 20 has an opening portion 23 spanning between the first cover 21 and the second cover 22. The box member 20 has a housing space formed in its interior by the first cover 21 and the second cover 22, and a vehicle-mounting device (not shown) is housed in the housing space.

The inner circumferential surface 23a of the opening portion 23 is provided with multiple groove portions 24 into which the radial direction extension portions 14a are to be fit, and protruding portions 25 that are located between the groove portions 24. That is, a recessed and protruding shape is formed due to the groove portions 24 and the protruding portions 25 being provided alternatingly.

As shown in FIG. 3, the groove portions 24 each have a pair of wall portions 24a that are arranged in parallel in the insertion direction in which the cylindrical conductive member 14 is inserted. The wall portions 24a engage with (come into contact with) the radial direction extension portions 14a of the cylindrical conductive member 14 when the cylindrical conductive member 14 and the box member 20 are moved relative to each other in the insertion direction or the direction opposite to the insertion direction in a state in which the cylindrical conductive member 14 is assembled in the box member 20. For this reason, a case is suppressed in which the cylindrical conductive member 14 falls out of the box member 20 and the cylindrical conductive member 14 enters the box member 20 more than necessary.

Also, the protruding portions 25 engage with (come into contact with) the radial direction extension portions 14a of the cylindrical conductive member 14 when the cylindrical conductive member 14 and the box member 20 are moved relative to each other in the circumferential direction of the cylindrical conductive member 14 in a state in which the cylindrical conductive member 14 is assembled in the box member 20. For this reason, a case is suppressed in which the cylindrical conductive member 14 rotates with respect to the box member 20, which is an attachment target.

Also, the inner circumferential surface 23a of the opening portion 23 is in contact with the outer circumferential surface 14b of the cylindrical conductive member 14 in the radial direction, and thus the cylindrical conductive member 14 and the box member 20 are electrically connected.

Next, an action of the present embodiment will be described.

With the wire harness 10 of the present embodiment, the braided member 12 and the cylindrical conductive member 14 are connected by the band 13, which is made of metal. Also, the cylindrical conductive member 14 is electrically connected due to being attached to the box member 20, which is made of metal. For this reason, an electromagnetic shield effect of the electrical wire 11 is obtained by the cylindrical conductive member 14 and the braided member 12.

The radial direction extension portions 14a are provided on the end portion in the axial direction of the cylindrical conductive member 14 of the present embodiment, and the radial direction extension portions 14a are fit into the groove portions 24 of the box member 20 when the cylindrical conductive member 14 is attached to the box member 20.

Next, effects of the present embodiment will be described.

(1) It is possible to restrict rotation of the cylindrical conductive member 14 with respect to the box member 20 due to the cylindrical conductive member 14 including the radial direction extension portions 14a that engage with the box member 20 in the circumferential direction of the cylindrical conductive member 14.

(2) Due to the cylindrical conductive member 14 including the radial direction extension portions 14a, engagement with the box member 20 in the circumferential direction of the cylindrical conductive member 14 can be made reliable.

(3) Due to including multiple radial direction extension portions 14a, engagement with the box member 20 in the circumferential direction of the cylindrical conductive member 14 can be made more reliable. Also, the load with respect to one radial direction extension portion 14a can be dispersed, and thus deformation of the cylindrical conductive member 14 (radial direction extension portion 14a) can be suppressed.

Note that the above-described embodiment may be modified as follows.

In the above-described embodiment, a configuration was used in which the cylindrical conductive member 14 is provided with multiple radial direction extension portions 14a at approximately equal intervals in the circumferential direction, but there is no limitation to this. For example, it is also possible to employ a configuration in which multiple radial direction extension portions are provided at unequal intervals in the circumferential direction.

Figure 4:
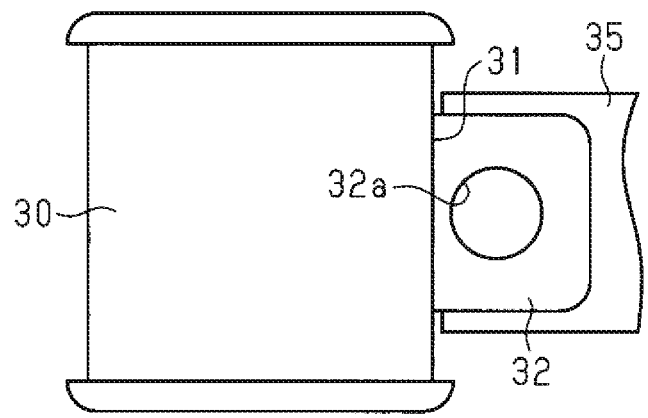
FIG. 4 is a front view of a cylindrical conductive member of a modified example.

In the above-described embodiment, radial direction extension portions 14a (radial direction extensions) that extend outward in the radial direction from one end portion of the cylindrical conductive member 14 were employed as the rotation restriction portions (rotation restriction), but the present disclosure is not limited to this. For example, as shown in FIG. 4, it is also possible to use a configuration in which a bolt insertion hole 32a is formed in one extension piece 32 that extends in the radial direction from the external circumferential surface 31 of the cylindrical conductive member 30, and electrical connection is achieved by inserting a bolt (not shown) serving as a fastening member (fastener) into the bolt insertion hole 32a and fastening the bolt with a metal piece 35 provided on the vehicle body. In this manner, by fastening the cylindrical conductive member 30 to the metal piece 35, which is the attachment target, using the fastening member, it is possible to electrically connect the cylindrical conductive member 30 and the metal piece 35, which is the attachment target, and to restrict rotation of the cylindrical conductive member 30. Note that the number of extension pieces 32 is not limited to one, and may be changed as needed.

Figure 5:
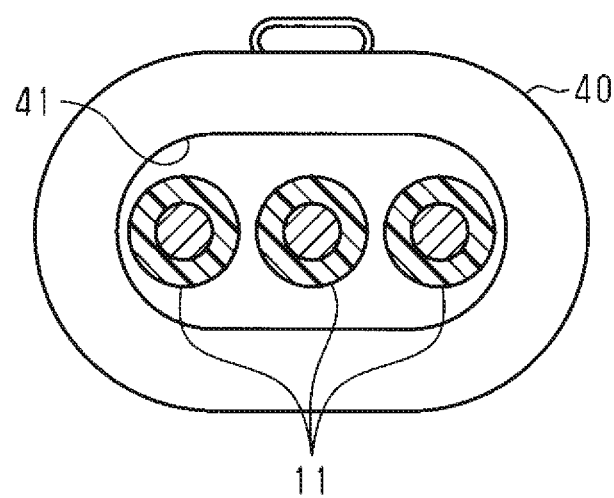
FIG. 5 is an end surface view of a cylindrical conductive member of a modified example.
Figure 6:
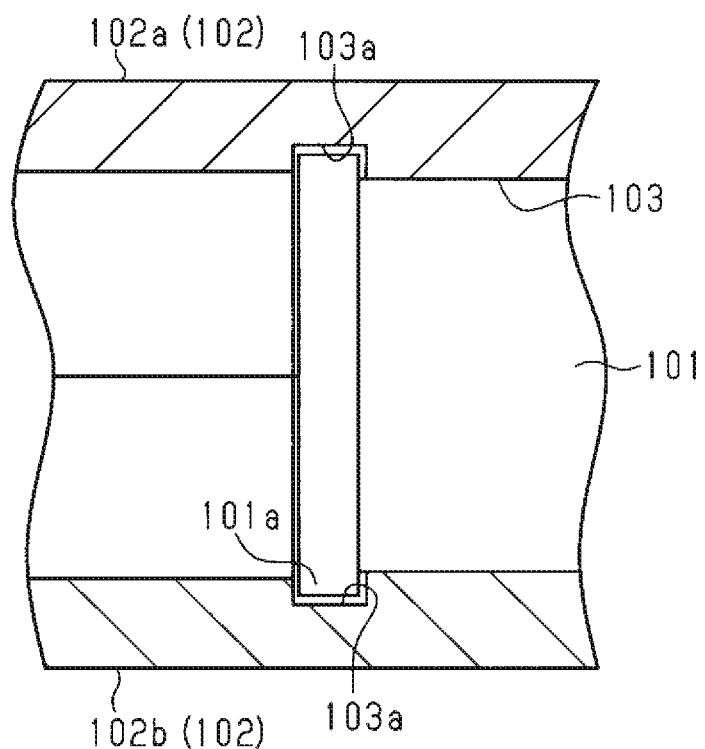
FIG. 6 is a cross-sectional view of a wire harness of a reference example.

In the above-described embodiment, the cylindrical conductive member 14 had a circular cylindrical shape, but the present disclosure is not limited to this. For example, as shown in FIG. 5, the cylindrical conductive member 40 may also be an elliptical cylindrical shape (flat cylindrical shape) having an elliptical opening portion 41 (opening). In this case, due to the opening portion 23 of the box member 20 having an elliptical shape that conforms to the outer shape of the cylindrical conductive member 40, it is possible to restrict rotation of the cylindrical conductive member 40. Also, due to the cylindrical conductive member 40 having an elliptical cylindrical shape (flat cylindrical shape), it is possible to eliminate needless housing space by matching the long axis direction of the elliptical opening portion 41 of the cylindrical conductive member 40 when electrical wires 11 are arranged in parallel on approximately the same straight line, and therefore it is possible to suppress an increase in the size of the cylindrical conductive member 40.

In the above-described embodiment, the present disclosure was applied to a wire harness 10 connecting a wheel driving motor and an inverter, but there is no limitation to this, and for example, the present disclosure may also be applied to a wire harness connecting an inverter and a high-voltage battery.

The above-described embodiments and modified examples may also be combined as needed.

It should be evident to a person skilled in the art that the present disclosure may also be realized in other specific modes without departing from the technical idea of the present disclosure. For example, some of the components described in the embodiments (or in one or more aspects) may also be omitted, or several components may be combined.

The invention claimed is:

1. A wire harness comprising:
   a braid composed of conductive strands;
   a cylindrical conductor having a first end and a second end in an axial direction of the cylindrical conductor, the first end being electrically connected to the braid, and the second end being attached to an attachment target; and
   an electrical wire inserted into the braid and the cylindrical conductor, wherein
   the second end of the cylindrical conductor includes a rotation restriction that restricts rotation of the cylindrical conductor with respect to the attachment target by engaging with the attachment target in a circumferential direction of the cylindrical conductor, and the rotation restriction also restricts the cylindrical conductor from moving in the axial direction by engaging with the attachment target in the axial direction.

2. The wire harness according to claim 1, wherein the rotation restriction is a radial direction extension that extends outward in a radial direction of the cylindrical conductor from an outer circumference of the cylindrical conductor.

3. The wire harness according to claim 2, wherein the radial direction extension is one of a plurality of radial extensions provided in the circumferential direction of the cylindrical conductor.

4. The wire harness according to claim 1, wherein the rotation restriction has an insertion hole into which a fastener that fastens the cylindrical conductor to the attachment target can be inserted.

5. A connection structure comprising:
   the attachment target; and
   the wire harness according to claim 1, wherein
   the cylindrical conductor is connected to the attachment target, which includes:
      an opening into which the cylindrical conductor can be inserted;
      a first engagement that engages with the rotation restriction in an insertion direction when the cylindrical conductor is inserted into the opening; and
      a second engagement that engages with the rotation restriction in the circumferential direction of the cylindrical conductor.

6. A connection structure comprising:
the attachment target; and
the wire harness according to claim 4,
the cylindrical conductor is connected to the attachment target using the fastener that is inserted into the insertion hole of the cylindrical conductor.

* * * * *